United States Patent Office 3,287,766
Patented Nov. 29, 1966

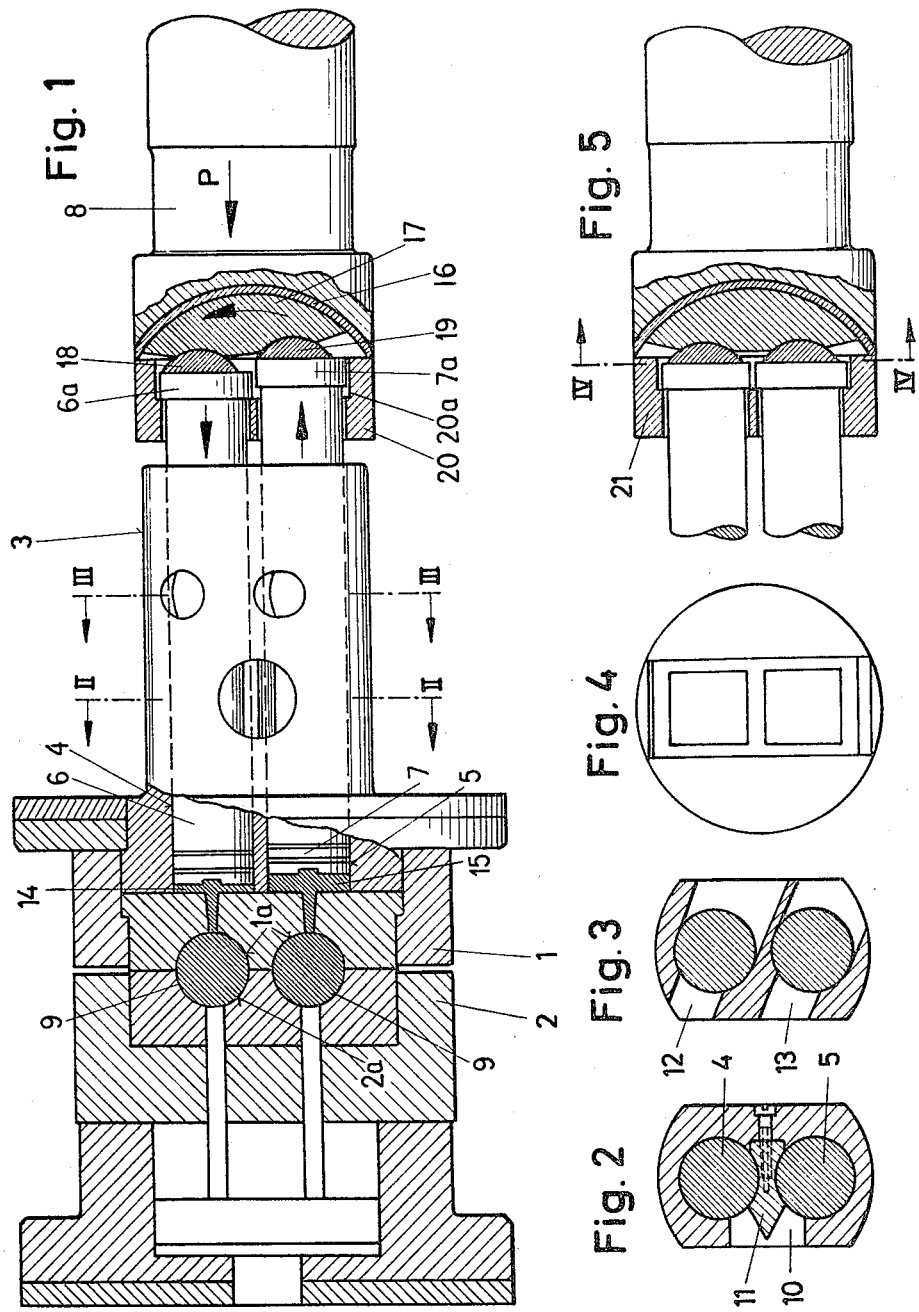

3,287,766
TWO PLUNGER INJECTION MOLDING MACHINE
Fred Drabert, Minden, Westphalia, and Gerhard Zwicker, Dutzen, Minden, Westphalia, Germany, assignors to Drabert Sohne, Minden, Westphalia, Germany, a German partnership
Filed Sept. 16, 1964, Ser. No. 396,995
Claims priority, application Germany, Oct. 19, 1963, D 42,759
3 Claims. (Cl. 18—30)

This invention relates to an injection press tool for the injection-moulding of shaped parts of hardenable moulding material, which comprises two tool halves, one half of which is so constructed that the pre-heated mould material introduced to the tool is injected after compression and plasticisation and is subsequently subjected to a hardening process.

In a previously proposed arrangement, the moulding material is introduced into a single injection cylinder, in which an injection piston is slidably mounted. If consideration is given to this known injection tool with regard to widening the possbilities of application and to processing a larger volume to be extruded of a synthetic-resin material on the basis of a more rapid plasticisation, knowledge of the operation and observation of the injection cylinder during the impact of the hot injection piston on the moulding material necessarily gives rise to the requirement for an enlargement of the surrounding heating surface of the particles of the moulding material.

According to the present invention there is provided an injection-moulding press tool for the injection moulding of articles of hardenable material, comprising two parts of a mould, each part being formed with a mould cavity, cylinder means secured to one of the said mould parts and having at least two bores, an injection piston means slidable in each bore, and a piston rod for actuating the piston means.

The moulding material quantity which is to be injected is fed to both cylinders in two halves and thus the heating surrounding surface as a result of the enlarged exterior surfaces is brought closer together and thus the heating is more effective. The particles of moulding material lying in the interior are affected by the heating source so considerably that the plasticisation point is reached far more rapidly than by the use of the single cylinder which was the case previously.

A further advantage of the double or multiple cylinder arrangement lies in the fact that a larger number of mould cavities can be provided at the two injection cylinder front faces, since these can be spaced further apart from one another, in contrast to the circular surface of similar area of only a single cylinder.

Should in contrast to the above-described provision of a large number of mould cavities, only a single mould cavity be constructed for a single moulded part of larger volume and, in particular, greater length, on the injection cylinder front face with a corresponding multiplicity of injection points then by the application of a double or multiple cylinder according to the invention the possibility is presented of arranging the injection points so far towards the outside that with an extreme ratio of breadth to length of the moulded part a favourable delivery of material particles to both ends is possible.

In a further modification of the injection-moulding tool according to the invention with a double cylinder, a device is provided which it is contended, that with difference in charge to both injection cylinders for unequal volumes it is possible to achieve an equalisation of pressure which at the injection cylinder supplied with an excess quantity that the injection piston is held back whilst the other injection cylinder supplied with less than the required quantity is so actuated that the injection piston moves more rapidly and at both injection chambers of the injection tool an equal value of force is exerted, which ensures an equal specific injection pressure in all of the mould cavities. If this device is not provided, then with small difference in the charge in the two injection cylinders the one or the other or both pistons are prevented from reaching their end positions.

Two embodiments of an extrusion press tool in accordance with the invention will now be described, by way of example, with reference to the accompanying diagrammatic drawing, in which:

FIGURE 1 is a plan, partly in section of the injection press tool according to the invention;

FIGURE 2 is a cross-section on the line II—II of FIGURE 1;

FIGURE 3 is a cross-section on the line III—III of FIGURE 1;

FIGURE 4 is a cross-section on the line IV—IV of FIGURE 5; and

FIGURE 5 is a part-section through a further embodiment showing the connection of the injection pistons with the piston rod of the injection press tool according to the invention.

Referring now to the drawing, and particularly to FIGURES 1 to 4, one part of the injection tool 1, 2 is secured to a double cylinder 3 in the bores 4, 5 of which two injection pistons 6, 7 are slidably mounted. These are actuated by a common piston rod 8.

Injection chambers 1a, 2a, are formed in both parts 1, 2 of the injection press tool in which the moulded workpiece 9 is formed.

An inlet passage 10 in communication with both bores 4, 5 serves for the introduction of the moulding material and a charge piece 11 serves for the division of the material introduced between the two bores 4, 5. Two openings 12, 13 preferably inclined to the longitudinal axis of the two bores 4, 5, are arranged towards the rear of the double cylinder 3 and these correspond to the end shapes of both injection discs 14, 15.

A bearing seating 16 is arranged in the end of the piston rod 8, in which a slidable member 17 is mounted which can move in a horizontal plane as indicated by an arrow in FIGURE 1. In this slidable member 17 cavities are formed in which two further part-spherical slidable members 18, 19 are carried in a similar manner. The surfaces of both slidable members 18 and 19 lie at the ends of both the injection pistons 6, 7. A ring 20 is connected with the piston rod 8, within which the injection pistons 6, 7 with their injection piston shoulders 6a, 7a can be moved axially within limits. For this purpose, the ring 20 has step 20a, which serves as a stop for the injection piston shoulders 6a, 7a of the corresponding injection pistons, 6, 7.

If, on the contrary, it is required to prevent both the injection pistons 6, 7 being displaced axially relatively to one another, when, for example, only one mould part encompassing both faces of the injection cylinder has to be tied together, then a ring 21 (FIGURE 5) is provided, which prevents the relative movement of the injection pistons 6, 7 and in this manner provides a rigid double piston system.

The manner of operation of the injection moulding machine according to the invention of FIGURES 1 to 4 is as follows:

If for example the bore 5 of the double cylinder 3 is supplied with an oversized charge, then the reaction force of the injection piston 7 which is first to impact with the moulding causes a movement of the slidable member 17 in an anti-clockwise sense which has the result that the injection piston 6 is hastened in such a manner that both injection chambers 1a, 2a of the injection tool 1, 2 are subjected to the same value of force. By this means, an equal specific injection pressure is ensured in both mould cavities 9.

We claim:

1. An injection-moulding press tool for the injection moulding of articles of hardenable material, comprising two parts of a mould, each part being formed with a mould cavity, cylinder means secured to one of the said mould parts and having at least two bores, an injection piston means slidable in each bore, a piston rod for actuating the piston means, and a device between the said piston rod and the piston means by which random differences in the pressures which arise in the bores of the cylinder in the introduced mass of material are equalised before the cessation of the injection process in such a manner that the specific injection pressure in the interconnected mould cavities is equalised, the said device comprising a part-spherical member mounted for movement in a complementary recess in the end of the piston rod and an additional part-spherical member disposed at the end of each piston for sliding engagement in complementary recesses in the said part-spherical member, whereby, in operation, if one of the bores of the double cylinder is supplied with an excess quantity of moulding material for the mould cavity and the other bore is supplied with a relatively smaller quantity of moulding material, the piston of the bore with an excess quantity which first encounters resistance to movement on impact with moulding material, transmits a reaction force to the corresponding additional part-spherical member which in turn causes sliding displacement of the first-mentioned part-spherical member and thereby substantially equalises the forces acting on the two pistons and thus also the pressure in the two mould cavities.

2. An injection-moulding tool according to claim 1, comprising a ring member connected to the end of the piston rod adjacent the piston means, an internal step on the ring member, and a shoulder formed on each piston means and disposed within the ring member serves as a stop for the shoulders of the piston means.

3. An injection-moulding press tool for the injection moulding of articles of a thermo-setting synthetic-resin, comprising a two-part mould, each part being formed with two mould cavities, a cylinder secured to one mould part having two bores which communicate with feeder bores of the adjacent mould part, and an opening in the wall of the cylinder leading to both bores, means in the opening for dividing a charge between the two bores, an injection piston slidable in each bore, a piston rod for the actuation of both pistons, a member mounted in the end of the piston rod defining a concave part-spherical recess, a slide having a complementary convex part-spherical surface movable in the recess and having a pair of concave part-spherical surfaces facing the piston ends, and convex part-spherical heads on the piston ends movable in the concave surfaces of the slide, in operation different reaction forces generated by the moulding material in the injection bores causing the slide to move laterally and thus cause the piston rod to exert an equal force on the two pistons.

References Cited by the Examiner
UNITED STATES PATENTS 1,952,241    3/1934    Eckert _____ 18—30
2,672,650    3/1954    Westerberg _____ 18—12 X

FOREIGN PATENTS 587,186    4/1947    Great Britain.

J. SPENCER OVERHOLSER, Primary Examiner.

W. L. McBAY, Assistant Examiner.